Figure 1:
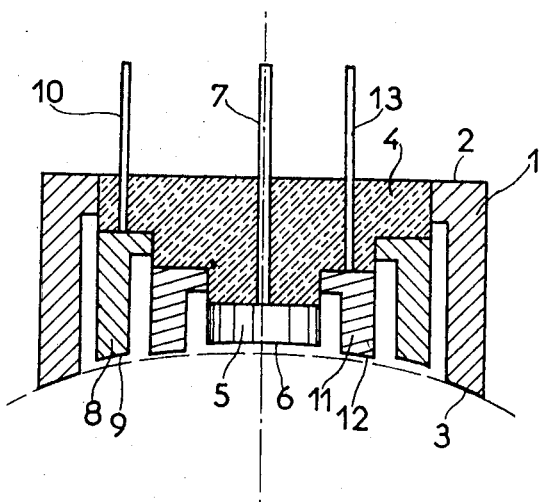

United States Patent [19]
Bernard et al.

[11] 3,742,767
[45] July 3, 1973

[54] BALL ELECTROSTATIC ACCELEROMETER

[75] Inventors: Alain M. Bernard; Michel J. L. Gay, both of Fresnes, France

[73] Assignee: Office National D'Etudes Et De Recherches Aerospatiales, Chatillon, France

[22] Filed: Jan. 31, 1972

[21] Appl. No.: 222,255

[30] Foreign Application Priority Data
Feb. 2, 1971   France .............................. 7103346

[52] U.S. Cl. .............................. 73/517 B, 308/10
[51] Int. Cl. ........................................... G01p 15/08
[58] Field of Search .......................... 73/505, 517 B; 308/10

[56] References Cited
UNITED STATES PATENTS
3,438,267   4/1969   Contenson et al. ............... 73/517 B
3,338,644   8/1967   Atkinson et al. ..................... 308/10

Primary Examiner—James J. Gill
Attorney—Abraham A. Saffitz

[57] ABSTRACT

An electrostatic accelerometer comprising a ball and casing and having a ball controlling device for each of the three orthogonal axes. Said accelerometer comprises for each axes a differential electric circuit for detecting the position of the ball and an electrostatic circuit for controlling the position of the ball having two pairs of coaxially secured electrodes whose internal surfaces facing the ball are located on the same sphere and are of equal area. With this structure, the cross effect of the electrostatic charge of the ball on the sensitivity of the accelerometer is cancelled.

6 Claims, 2 Drawing Figures

PATENTED JUL 3 1973 3,742,767

BALL ELECTROSTATIC ACCELEROMETER

The invention relates to an improvement to the three dimensional ball-type electrostatic micro-accelerometers of the kind described in U.S. Pat. No. 3,438,267.

It will be recalled that in devices of the aforementioned kind, the ball, which is initially at rest in the casing, is brought into the measuring condition, i.e., into the space in which it is under the action of the position control device, during a preliminary or "pre-positioning" operation performed by means of an electrostatic force produced by the position-control electrostatic circuit comprising stationary electrodes which are borne by the casing, are located on the three orthogonal axes, and cooperate with the ball.

After the pre-positioning operation has been performed, the ball retains an electrostatic charge whose value is related to the energy applied.

The charge occurs mainly between the ball and the casing and is localised at that region of the ball which is nearest to the casing, producing interference which interferes with the motion of the ball and is a source of random errors in the electronic control circuit, which affect the measurements and reduce the sensitivity of the micro-accelerometer.

In order to obviate the aforementioned disadvantage, it has been proposed to supply each pair of opposite electrodes of the position-control electrostatic circuit of each of the three axes with two voltages whose sum remains constant independently of the position of the ball. In the latter case, if the capacitances of the electrodes with respect to the ball are equal on each of the three axes, and if the sum of the voltage used is identical when the ball is in the measuring position, the charge remain localised opposite the electrodes.

The aforementioned method is efficient for electrodes of the kind described in the aforementioned Patent Specification and patent of addition, but the electrodes have to be supplied even when the ball is not moving, thus requiring the use of relatively heavy, bulky supply devices.

The invention aims to provide a micro-accelerometer comprising means which make it unnecessary to maintain an electrostatic charge at the surface of the ball, the means improving the sensitivity of the micro-accelerometer and enabling it to measure even weaker accelerations, while simplifying its construction.

The invention relates to a ball-type three-dimensional electrostatic micro-accelerometer, each orthogonal axis of which is provided with a differential electrostatic position detector and a position-control electrostatic circuit having two pairs of coaxially secured electrodes borne by support bushings secured to the casing cooperating with the ball, and means for amplifying the signals of the position detecting means and applying them to the position-control circuit. The invention is characterised in that each electrode support bushing supports a first, polar position-control electrode in the form of a spherical cap surrounded at a short distance by a second position-control electrode coaxial with the first and in the form of a spherical ring whose sphericity and surface area are equal to those of the first polar electrode, the electrodes being separated by a position-detecting electrode in the form of a spherical ring coaxial with the first two electrodes, and the three electrodes being recessed with respect to the spherical interior of the casing in order to prevent them from coming into contact with the ball. The invention is also characterised in that the means for amplifying the signals of a position detecting means and applying them to the position-control circuit comprise a switching circuit and two amplifiers each supplying voltages of equal value and opposite phase respectively to the first and second electrode controlling the position of each support bushing, so that the resultant of the electrostatic charges at the surface of the ball is zero.

Figure 2:
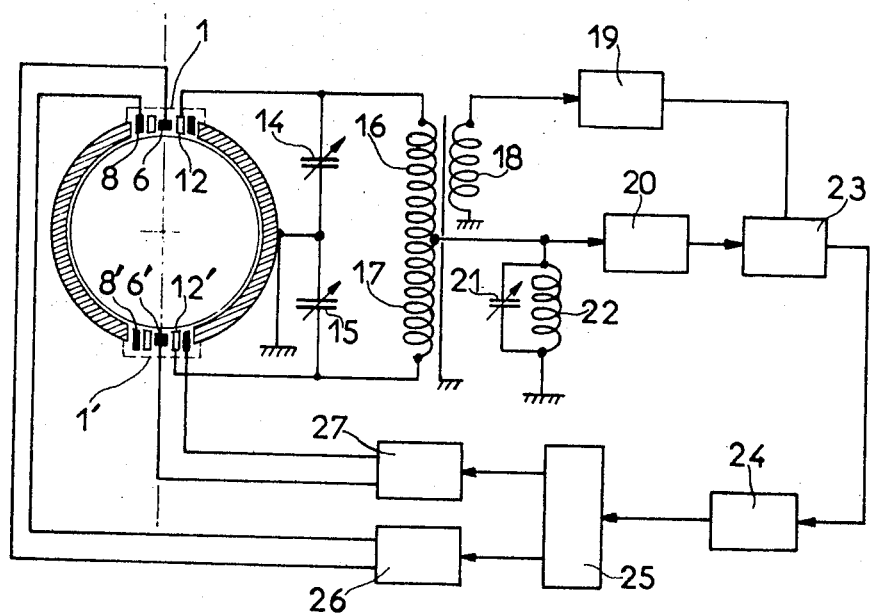

An exemplary embodiment of the invention will now be described in detail with reference to the accompanying drawing in which :

FIG. 1 is a diagrammatic cross-section of an electrode support bushing of the micro-accelerometer according to the invention, and FIG. 2 shows a circuit for controlling the position of the ball along a vertical axis.

In FIG. 1, the electrode support bushing comprises a tubular metal body 1 bounded by a flat surface 2 and by a surface 3 in the form of a spherical ring on the sphere bounding the interior of the micro-accelerometer casing. The bushing is secured to the casing by means not shown in the drawing.

An insulating disc 4 is disposed inside member 1. The centre of disc 4 supports a first position-control electrode 5 in the form of a cylinder bounded by a spherical cap 6 slightly recessed with respect to ring 3, the other surface of cap 6 being extended by a shank, rod or the like 7 used for making connections.

Disc 4 supports a second position-control electrode 8 which is concentric with electrode 5 and is in the form of a cylindrical ring bounded by a spherical annular surface 9 forming part of the same sphere, and having the same area as the spherical cap 6. The other surface of electrode 8 is provided with a connection 10.

Finally, disc 4 supports a detecting or sensing electrode 11 which is concentric with the other two electrodes and is in the form of a cylindrical ring bounded by a spherical annular surface 12 which is recessed with respect to, but very near, the spherical ring 3, the other surface of electrode 11 being provided with a connection 13.

In order to shield the ball from the effects of the charges borne by the insulating material, the aforement metal elements 1, 5, 8 and 11 are shaped and disposed so as to form a screen between the insulating material 4 and the ball.

As shown in FIG. 1, all the electrodes are recessed with respect to the frame of the support bushing, whose spherical ring 3 bounds the interior of the ball casing. The last-mentioned feature prevents contact with the ball when the latter is not in the normal operating position and simplifies the construction of the micro-accelerometer, thus avoiding the use of abutments secured to the interior of the casing, as described in the aforementioned Patent.

In a micro-accelerometer constructed by the inventors, the position-control electrodes were recessed 1 mm and the position-detecting electrode was recessed 30 microns. The space between the position-control electrodes and the ball helps to maintain the sensitivity coefficient of the micro-accelerometer constant over a wide range of temperature variations, since the motion of the ball is always very slight compared with the gap produced.

FIG. 2 shows the control circuit according to the invention and the two electrode support bushings 1 and 1' along the vertical axis of the micro-accelerometer.

The capacitors formed by the position-detecting electrodes 12, 12' and the ball are shunted by variable capacitors 14, 15 and form part of a bridge comprising inductances 16, 17 pertaining to the secondary winding of a transformer whose primary winding 18 is supplied by an oscillator 19.

The common point of capacitors 14, 15 is earthed to the casing.

The common point of inductances 16, 17 is connected to the input of an amplifier 20 and is also earthed to the casing via a tuned circuit comprising a variable capacitor 21 in parallel with an inductance 22.

If the ball moves under the action of acceleration to be measured, e.g., in the direction of bushing 1', it produces an unbalance signal which is amplified by amplifier 20 and detected by the synchronous detector 23. The signal is then applied to a correcting network 24 and a switching circuit 25 whose output signal, the value of which is proportional to the movement of the ball, is applied to the input of an amplifier 26 which supplies two voltages of equal value and opposite phase to electrodes 6, 8 controlling the position of bushing 1, which thereupon attracts the ball.

If the ball moves in the direction of bushing 1, the switching circuit 25 supplied the input of amplifier 27, which supplies two voltages of equal value and opposite phase to electrodes 6', 8' controlling the position of bushing 1'.

The electrostatic charges produced by the two concentric electrodes controlling a single bushing, when supplied in the aforementioned manner with voltages of equal value and opposite phase, have a zero resultant, thus preventing any interaction between the charges produced by the control electrodes along the three orthogonal axes of the micro-accelerometer.

Which is claimed is:

1. In a three orthogonal axes elctrostatic accelerometer comprising a ball and casing device and having for each axis a ball position detection circuit connected to detection electrodes and a ball position controlling circuit controlled by said detection circuit and connected to control electrodes, that improvement which is characterized in that in said control electrodes for each pole of each axis there are provided a pair of electrodes having the ball facing internal surfaces which are coaxial with each said axis located on a sphere and which have equal areas and electrical charges of equal amplitude but opposite phase applied thereto to control the position of the ball.

2. Three orthogonal axes electrostatic accelerometer according to claim 1, wherein the two electrodes controlling the position of a pole comprise a first electrode in the form of a spherical cap and a second electrode in the form of a spherical ring, the two electrodes being separated by a position-detecting electrode in the form of a spherical ring, coaxial with the aforementioned position-control electrodes.

3. Three orthogonal axes electrostatic accelerometer according to claim 1, wherein the position-detecting and position-control electrodes are recessed with respect to the spherical interior of the casing around the ball.

4. Three orthogonal axes electrostatic accelerometer according to claim 3, wherein the detecting electrodes are, in a lesser degree, recessed than the position-control electrodes with respect to the spherical interior of the casing.

5. Three orthogonal axes electrostatic accelerometer comprising a ball and casing device and having for each axis a ball position detection circuit connected to detection electrodes and ball position controlling circuit connected to said detection circuit and to control electrodes which generates two voltages of equal amplitude and opposite polarity respectively applied to the two control electrodes of each pole of said axis, said two control electrodes having equal internal areas so that said area receive electrical charges of equal amplitude and opposite polarity, which nullify the effect of the charge of the ball.

6. Three orthogonal axes electrostatic accelerometer according to claim 5, wherein two pairs of opposite control electrodes are provided for each axis, the electrodes of one pair being energized by two voltages of equal amplitude and opposite polarity when the ball is shifted in one direction and the electrodes of the other pair being energized by two similar voltages when the ball is shifted in the opposite direction.

* * * * *